P. A. LAWRENCE.
RETAINER FOR RECEPTACLE COVERS.
APPLICATION FILED JUNE 2, 1911.
1,026,096.
Patented May 14, 1912.
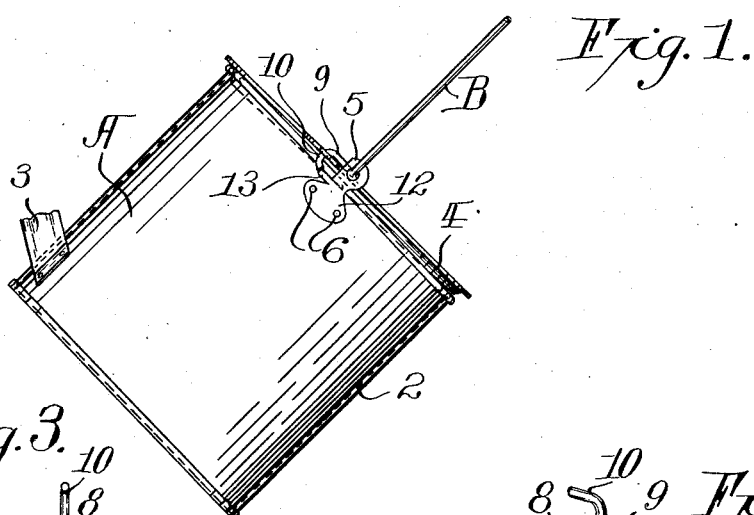
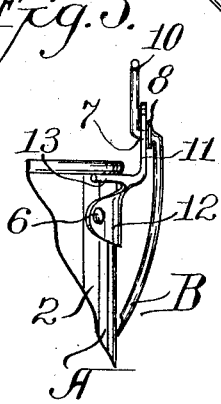
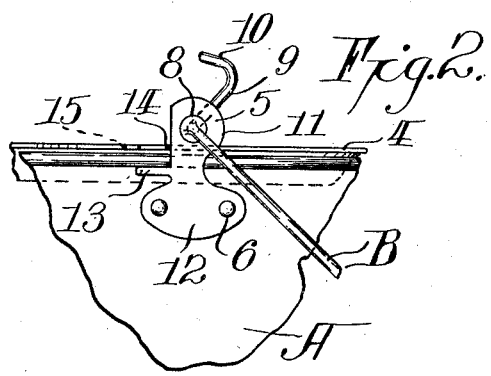
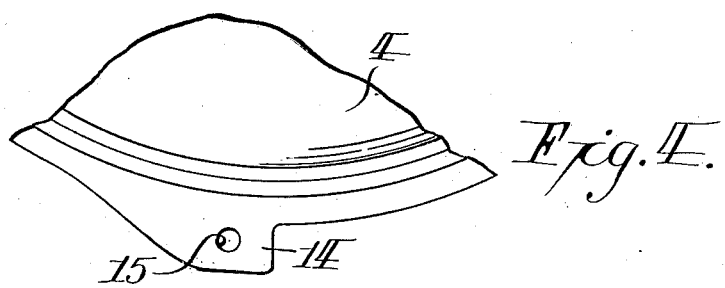
Witnesses:
Inventor:
Phebe A. Lawrence,
by: F. S. Bradbury,
Attorney.
COLUMBIA PLANOGRAPH CO., WASHINGTON, D. C.

UNITED STATES PATENT OFFICE.

PHEBE A. LAWRENCE, OF ST. PAUL, MINNESOTA.

RETAINER FOR RECEPTACLE-COVERS.

1,026,096.  Specification of Letters Patent.  Patented May 14, 1912.

Application filed June 2, 1911. Serial No. 630,809.

*To all whom it may concern:*

Be it known that I, PHEBE A. LAWRENCE, a citizen of the United States, residing at St. Paul, in the county of Ramsey and State of Minnesota, have invented a new and useful Improvement in Retainers for Receptacle-Covers, of which the following is a specification.

My invention relates to improvements in retainers for receptacle covers and more particularly is adapted for use with a receptacle for holding its cover in place and which will permit limited play of said cover when said receptacle is tilted to drain liquid off of its contents. Further my invention is adapted to limit the movement of the bail of said receptacle so that it will not move from substantially upright position in one direction when the receptacle is tilted for draining purposes.

In the accompanying drawing forming part of this specification, Figure 1 is a side elevation of my invention; Fig. 2 is a detail taken when the bail is turned down; Fig. 3 is another detail looking endwise toward the portion illustrated in Fig. 2, and Fig. 4 is a plan detail looking at the cover.

In the accompanying drawing A represents a receptacle such as a culinary cooking utensil having a body 2 which is provided with a handle 3 of ordinary construction and a cover 4. To the body 2 is hinged a bail B, the ends of which are journaled in bail ears 5 the flanges of said bail ears being secured to the body 2 by rivets 6. The upper portion of each bail ear is off-set away from the side of the body 2 so that an end portion of the bail may be freely journaled at 7 in the off-set portion 11 of the bail ear. A stop shank 10 at substantially right angles to each extremity of the bail is free to turn without interfering with the cover 4 in place on the receptacle. The portion of the bail adjacent the perforation 7 is provided with a shoulder 8 outside of the bail ear which assists in limiting longitudinal play of the bail through the ear.

The stop 10 is formed by the shank projecting at each extremity of the bail, said shank being bent at 9 into a hook. The cover of the receptacle has an extension 14 back of each ear formed with a shoulder projecting out from its perimeter and back of which is a perforation 15. When the bail is turned into upright position as illustrated in Fig. 1 the hook of said stop 9 is adapted to pass through the perforation 15, thus engaging the cover and holding it from displacement except to a limited extent as illustrated in Fig. 1.

Each of the bail ears is formed with a lug 13 against which the end of the hook on the stop 9 of the bail is adapted to impinge and prevent movement of the bail from substantially vertical position in one direction while the cover is engaged by the stops such as 9. The position of the lug 13 and of the shank of the stop 9 is such as to permit limited vertical play of the cover on the body of the receptacle when the bail is in upright position. Thus the body of the receptacle may be tilted and liquid poured off of the contents of the receptacle through the space between the brim of the receptacle and the inner face of the cover.

In use the cover is placed on the body 2 of the receptacle while the bail is turned down into the position illustrated in Fig. 2, the extensions 14 being positioned against the edges of the bail ears away from the bail when it is turned down. When it is desired to drain liquid off of the contents of the receptacle the bail B is turned up into the position illustrated in Fig. 1 with the stops 9 engaging the cover through the perforations 15. The bail B and the handle 3 are then grasped and the receptacle tilted, the cover in the meantime being forced out at its lower edge by the contents of the receptacle but prevented from being entirely displaced by the stops 9 which limit the movement of the cover. It will be noted that the weight of said stop 9 tends to hold the bail in elevated position when the receptacle is standing upon a horizontal support.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A receptacle comprising a body, a cover loosely disposed upon said body, a bail ear upon said body and a bail journaled in said bail ear and having an end formed with a shank at substantially right angles to said bail, the end of said shank having a hook, said cover having a perforated extension through which said hook passes when said bail is turned into upright position, whereby the cover of said receptacle is held against entire displacement from said body and limited play permitted when said bail is elevated.

2. A receptacle comprising a body, a cover loosely disposed upon said body, a bail ear upon said body, a bail journaled in said bail ear and having an end formed with a shank at substantially right angles to said bail, the end of said shank being formed with a hook, said cover having a perforation near the perimeter through which said hook is adapted to pass when said bail is turned into upright position and said bail ear being formed with a lug against which said hook is adapted to impinge to limit the movement of said bail in one direction when said hook is engaged through said cover, and said shank being spaced from said cover when said bail is in elevated position, whereby limited displacement of said cover is permitted when engaged by said hook to provide pouring space between the perimeter of said cover and the body of said receptacle for the purposes specified.

In testimony whereof, I have signed my name to this specification in the presence of two subscribing witnesses.

PHEBE A. LAWRENCE.

Witnesses:
H. L. FISCHER,
M. C. ADAMS.

Copies of this patent may be obtained for five cents each, by addressing the "Commissioner of Patents, Washington, D. C."